(12) United States Patent
Liu et al.

(10) Patent No.: US 9,864,108 B2
(45) Date of Patent: Jan. 9, 2018

(54) MOLDS FOR MAKING CONTACT LENSES

(71) Applicant: Novartis AG, Basel (CH)

(72) Inventors: Alice Weimin Liu, Alpharetta, GA (US); Burkhard Dietrich, Monheim (DE)

(73) Assignee: Norvartis AG, Basel (CH)

( * ) Notice: Subject to any disclaimer, the term of this patent is extended or adjusted under 35 U.S.C. 154(b) by 401 days.

(21) Appl. No.: 14/575,413

(22) Filed: Dec. 18, 2014

(65) Prior Publication Data

US 2015/0177422 A1 Jun. 25, 2015

Related U.S. Application Data

(60) Provisional application No. 61/919,074, filed on Dec. 20, 2013.

(51) Int. Cl.
| | |
|---|---|
| *B29D 11/00* | (2006.01) |
| *G02B 3/00* | (2006.01) |
| *B29C 35/02* | (2006.01) |
| *B29L 11/00* | (2006.01) |

(52) U.S. Cl.
CPC ............ *G02B 3/00* (2013.01); *B29C 35/02* (2013.01); *B29D 11/00519* (2013.01); *B29K 2909/08* (2013.01); *B29L 2011/0016* (2013.01)

(58) Field of Classification Search
CPC ...... B29D 11/00519; B29C 35/02; G02B 3/00
See application file for complete search history.

(56) References Cited

U.S. PATENT DOCUMENTS

| | | | |
|---|---|---|---|
| 4,898,777 | A | 2/1990 | Kindler |
| 5,147,435 | A | 9/1992 | Kubota |
| | | (Continued) | |

FOREIGN PATENT DOCUMENTS

| | | | |
|---|---|---|---|
| EP | 0331483 | A2 | 9/1989 |
| EP | 0835848 | A2 | 4/1998 |
| | (Continued) | | |

OTHER PUBLICATIONS

PCT International Search Report dated Mar. 2, 2015, International Application No. PCT/US2014/071227, International Filing Date Dec. 18, 2014.

(Continued)

*Primary Examiner* — Mathieu Vargot
(74) *Attorney, Agent, or Firm* — Sheng-Hsin Hu

(57) ABSTRACT

The present invention general related to a reusable mold for making a contact lens comprises a first mold half having a first mold surface in contact with a polymerizable and/or crosslinkable silicone containing lens forming composition and a second mold half having a second mold surface in contact with the lens-forming composition, and the first mold half and the second mold half are configured to receive each other such that a cavity is formed between the first mold surface and the second mold surface. The cavity defines the shape of a contact lens to be molded. The reusable mold has at least one of the mold halves being made from an oxide glass comprising fluorine and/or fluoride. The mold made by oxide glass comprising fluorine and/or fluoride demonstrates improving mold cleanability with water based cleaning process.

9 Claims, 2 Drawing Sheets

(56) References Cited

U.S. PATENT DOCUMENTS

| | | | |
|---|---|---|---|
| 5,246,889 A * | 9/1993 | Kasuga | C03C 10/0045 106/35 |
| 5,508,317 A | 4/1996 | Müller | |
| 5,583,163 A | 12/1996 | Müller | |
| 5,629,246 A | 5/1997 | Iyer | |
| 5,789,464 A | 8/1998 | Müller | |
| 5,849,810 A | 12/1998 | Müller | |
| 5,958,809 A | 9/1999 | Fujiwara | |
| 6,627,124 B1 | 9/2003 | Herbrechtsmeier | |
| 6,800,225 B1 | 10/2004 | Hagmann | |
| 6,807,823 B2 | 10/2004 | Ohga | |
| 7,384,590 B2 | 6/2008 | Kelly | |
| 7,387,759 B2 | 6/2008 | Kelly | |
| 8,163,206 B2 | 4/2012 | Chang | |

FOREIGN PATENT DOCUMENTS

| | | | |
|---|---|---|---|
| JP | 61106211 A2 | 5/1986 | |
| JP | 2000326347 A2 | 11/2000 | |

OTHER PUBLICATIONS

PCT Written Opinion of the International Searching Authority dated Mar. 2, 2015, International Application No. PCT/US2014/071227, International Filing Date Dec. 18, 2014.

\* cited by examiner

MOLDS FOR MAKING CONTACT LENSES

This application claims the benefit under 35 USC §119 (e) of U.S. provisional application No. 61/919,074 filed 20 Dec. 2013, incorporated by reference in its entirety.

BACKGROUND

A great effort has been made to develop technologies for cast molding of hydrogel contact lenses with high precision, fidelity and reproducibility and at low cost. One of such manufacturing technologies is the so-called Lightstream Technology™ (Alcon) involving reusable molds and curing a lens-forming composition under a spatial limitation of actinic radiation (U.S. Pat. Nos. 5,508,317, 5,583,163, 5,789,464, 5,849,810, and 8,163,206). The Lightstream Technology™ for making contact lenses have several advantages. For example, reusable quartz/glass molds or/and reusable plastic molds, not disposable plastic molds, can be used, because, following the production of a lens, these molds can be cleaned rapidly and effectively of the uncrosslinked monomer or prepolymer and other residues, using a suitable solvent and can be blown dried with air. Disposable plastic molds inherently have variations in the dimensions, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, base curve, central thickness etc.) and to a low fidelity in duplicating complex lens design. By using reusable molds which are produced in high precision, one can eliminate dimensional variations inherently presented in disposable molds and thereby variation in contact lenses produced therefrom. Lenses produced according to the Lightstream Technology™ can have high consistency and high fidelity to the original lens design.

However, modern high-volume mass production process for medical devices like contact lenses utilizes re-usable molds in each production cycles. A pre-requisite that molds could be re-usable is that they have equivalent and reproducible clean surface properties in each production cycles. Especially the cleaning of molds utilized for the production of silicon hydrogel contact lenses by the Lightstream technology is very challenging: the molds are made of glass and quartz, i.e. have a high surface energy and are therefore easily deposited by the silicon compounds with their low surface energy utilized for the lens production.

This silicon compounds could be cleaned-off easily in laboratory by organic solvents like 2-Propanol. But for high mass-production process like the Lightstream technology an organic solvent based cleaning process is difficult to realize. Safety, environmental and consumption aspects in combination with high process times needed for solvent removing and rinsing prevents such an application. Therefore would be a water based cleaning process the best for such a process.

Therefore, there is still a need for new reusable molds that can be easily cleaned with water based cleaning process.

SUMMARY OF THE INVENTION

The invention, in one respect, relates to a reusable mold for making a contact lens, comprising a first mold half having a first mold surface in contact with a silicone containing lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the silicone containing lens forming composition is polymerizable and/or crosslinkable by an actinic radiation, wherein at least one of the mold halves is made from an oxide glass comprising fluorine and/or fluoride.

The invention, in another respect, relates to a method for producing a contact lens, comprising: the steps of:

(1) providing a contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein at least one of the mold halves is made from an oxide glass comprising fluorine and/or fluoride, (2) introducing a lens-forming composition into the cavity formed by the first and second molding surfaces, material, wherein the lens-forming material is crosslinkable and/or polymerizable by actinic radiation;

(3) crosslinking/polymerizing the lens-forming material in the mold to form a lens having a polymer matrix;

(4) opening the mold and removing the formed contact lens from the mold, (5) washing the first and second molding surface with a water base system, wherein the molding surface of step (5) is characterized by having a percentage of reduction in the lens forming material residue on the molding surface by at least 40% of the mold halves is made from an oxide glass comprising fluorine and/or fluoride relative to the molding surface of the mold halves is made from an oxide glass comprising no fluorine and/or fluoride.

DETAILED DESCRIPTION OF EMBODIMENTS OF THE INVENTION

Figure 1:
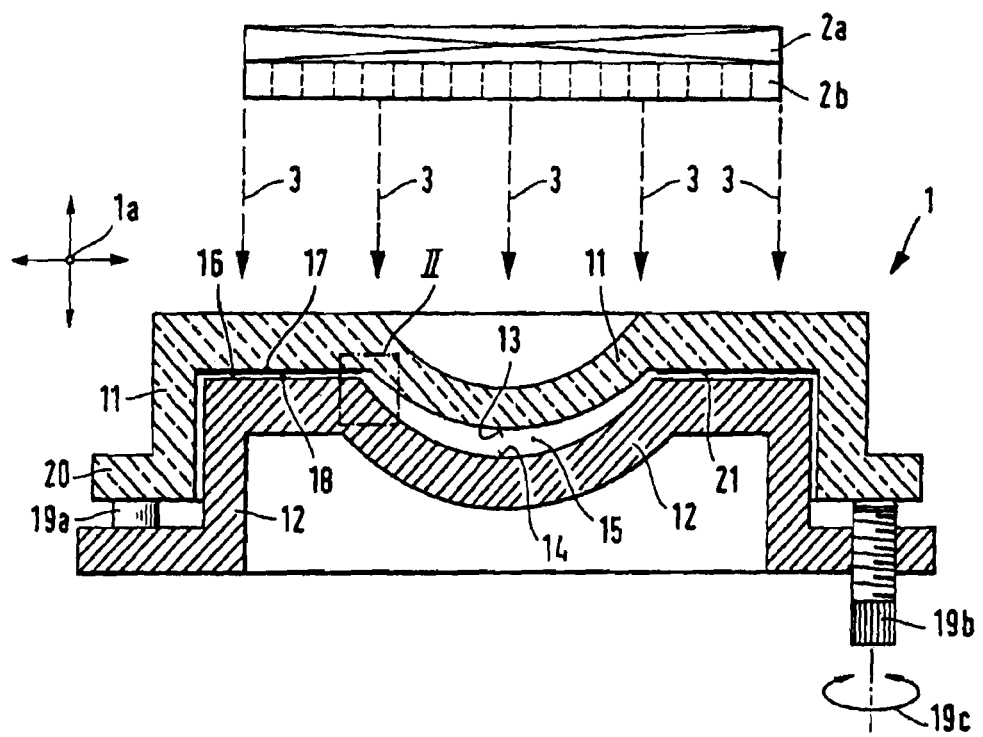
FIG. 1 shows a section through an exemplary embodiment of a casting mold according to the invention in the closed position.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. As employed throughout the disclosure, the following terms, unless otherwise indicated, shall be understood to have the following meanings "Quartz" refers to the second most abundant mineral in the Earth's continental crust, after feldspar. It is made up of a continuous framework of $SiO_4$ silicon-oxygen tetrahedra, with each oxygen being shared between two tetrahedra, giving an overall formula $SiO_2$.

"Oxide glass" refers to glass comprises oxide selected from the group consisting of Aluminum oxide, Antimony trioxide, Arsenic trioxide, Barium oxide, Bismuth(III) oxide, Boron trioxide, Calcium oxide, Cerium(III) oxide, Chromium(III) oxide, Gadolinium oxide, Germanium oxide, Iron (III) oxide, Lanthanum oxide, Lead(II) oxide, Lithium oxide, Magnesium oxide, Niobium pentoxide, Phosphorus pentoxide, Potassium oxide, Silicon dioxide, Sodium oxide, Strontium oxide, Sulfur dioxide, Tin dioxide, Titanium dioxide, Zinc oxide, Zirconium dioxide and combination therefore.

"Fluorine" refers to the chemical element with symbol F and atomic number 9.

"Fluorides" refers to compounds of fluorine.

"Phosphorus oxide" refers to phosphorus pentoxide (phosphorus (V) oxide, phosphoric anhydride), $P_2O_5$, phosphorus trioxide (phosphorus (Ill) oxide, phosphorous anhydride), $P_2O_3$ and several others, less common, oxides of phosphorus, including $P_4O_7$, $F_4O_8$, $P_4O_9$, PO and $P_2O6$.

"An optical quality surface" refers to a glass surface has a surface roughness less than 30 nm, preferably less than 20 nm, most preferably less than 10 nm.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic lens" refers to a contact lens and/or an intraocular lens. A "contact lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer" refers to a compound that has one sole ethylenically-unsaturated group.

The term "olefinically unsaturated group" or "ethylenically unsaturated group" is employed herein in a broad sense and is intended to encompass any groups containing at least one >C=C< group.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

A "lens-forming material" refers to a material which can be polymerized and/or crosslinked by actinic radiation to form a contact lens.

Actinic radiation refers to radiation of a suitable form of energy. Examples of actinic radiation includes without limitation light radiation (e.g., UV radiation), gamma radiation, electron radiation, X-ray irradiation, microwave irradiation, thermal radiation and the like.

Further aspects and advantages of the process according to the invention and of the device according to the invention will be seen from the description that follows, in conjunction with the drawings.

The device shown in FIG. 1 is designed for the manufacture of contact lenses from a liquid starting material which may be polymerized or crosslinked by UV radiation. It comprises a mold 1 and an energy source 2a, here a UV light source, as well as means 2b for directing the energy provided by the energy source 2a to the mold in the form of an essentially parallel beam. Of course, the energy source 2a and means 2b can also be combined to form a single unit.

The mold consists of two mold halves 11 and 12, each having a curved mold surface 13 and 14 which together define a mold cavity 15, which in turn determines the shape of the contact lens to be manufactured. The mold surface 13 of the upper mold half 11 in the drawing is convex and determines the rear and base surface of the contact lens with the connected edge area; this mold half is normally called the father mold half. Conversely, the mold surface 14 of the other mold half, which is correspondingly called the mother mold half, is concave and determines the front face of the contact lens to be manufactured, likewise with the connected edge area.

The mold cavity 15 is not completely and tightly closed, but in the embodiment illustrated is open around its peripheral edge which defines the edge of the contact lens to be manufactured, and is linked to a relatively narrow annular gap 16. The annular gap 16 is limited or formed by a flat mold wall 17 and 18 on each of the father mold half 11 and the mother mold half 12. In order to prevent complete closure of the mold, spacers, for example in the form of several bolts 19a or 19b, are provided on the mother mold 12, and these interact with a collar or flange 20 of the father mold 11 and keep the two mold halves at such a distance apart that the said annular gap 16 results. As is indicated symbolically in FIG. 1 by the right-hand spacer bolt 19b with a thread, the spacers may also be of adjustable or spring-action formation. In this way, the two mold halves 11, 12 can be moved towards one another during the crosslinking process to balance out leakage, by adjusting the spacers (indicated symbolically by the arrow 19c showing the direction of rotation) or against a spring action. Of course, the mold can be opened and closed in the usual manner, for example by means of a closure unit which is indicated here only by the arrow symbol 1a. Adjustment of the gap between the two mold halves 11, 12 to balance out leakage, may also be effected e.g. using this external closure unit.

It is also conceivable that, instead of the continuous annular gap 16 and the spacers 19a and 19b, a series of segmentous gaps may be provided, the intermediate areas between the individual segment gaps taking over the function of the spacers. Of course, other configurations of mold halves are also conceivable.

On the mold wall 17 in the area of the annular gap 16, there is a mask 21 which is impermeable to the energy form employed, here this is UV light, (or a mask which at least has poor permeability compared with the permeability of the mold), and this mask extends right to the mold cavity 15, and with the exception of the same, screens all the other parts, hollow spaces or areas of the mold 1 that are in contact with or may come into contact with the liquid, uncrosslinked, possibly excess material, from the radiated energy. Partial areas of the lens edge are therefore formed not by a limitation of the material by mold walls, but by a spatial limitation of the radiation or other forms of energy triggering polymerization or crosslinking.

In the case of UV light, the mask 21 may be preferably a chromium layer, that can be produced by processes known e.g. from photography or UV-lithography. The mask 21 does not necessary have to be fixed; it may also be, for example, removable or exchangeable.

Figure 2:
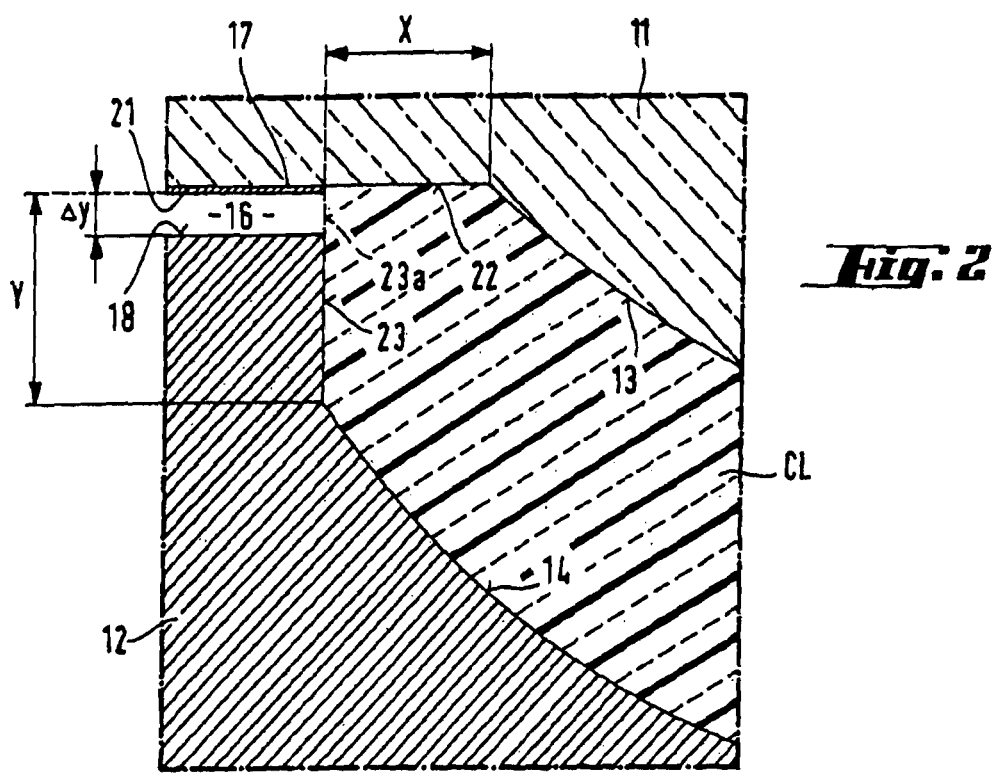
FIG. 2 is a detail, indicated by II in FIG. 1, on a greatly enlarged scale.

FIG. 2 shows the arrangement of the mold 1 in the transition region between the mold cavity 15 and the annular channel 16 as an enlarged detail. The cavity 15 has here, by way of example, a shape that corresponds to the typical rim geometry of a so-called soft contact lens CL. The cavity rim, and thus the lens rim, is formed here by two wall faces 22 and 23 which are arranged at right angles to one another and are arranged on the male and on the female mold halves 11 and 12 respectively. The width and the height of those two wall faces, and of the rim areas of the contact lens defined by them, are indicated by X and Y respectively. Obviously, the lens rim may in practice also be slightly rounded.

As can be seen clearly, the cylindrical wall face 23 of the female mold half 12 does not extend right up to the flat wall face 22 and the wall face 17, lying seamlessly adjacent thereto, of the male mold half 11, but is lower by the amount Δy, so that the annular gap 16 already mentioned, between the wall face 17 and the wall face 18 of the two mold halves 11 and 12, is formed or remains open.

The mask 21 provided on the wall face 17 of the male mold half 11 in this example embodiment extends horizontally exactly up to the extension 23a of the wall face. 23 of the female mold half 12. If the UV light, in the form of a parallel beam 3 causing the crosslinking, is incident at right angles to the wall face 22 and 17 and parallel to the cylindrical wall face 23, the space located at right angles below the mask 21 is in shadow and only the material located inside the cavity 15, that is inside the imaginary wall extension 23a, is crosslinked, resulting in a clean and burr-free lens rim which does not require any subsequent mechanical processing. If parallel energy radiation is used, therefore, disregarding the diffraction and scattering effects, which are usually negligible in practice, the contour of the mask 21 is transferred two-dimensionally parallel and (in this case) downwards into the rim area of the contact lens. Therefore, if the two mold halves 11 and 12 are separated from one another by the annular gap 16 of height Δy, the rim is formed towards the outside of the area resulting from that displacement by means of the spatial restriction of the energy radiation.

In general, the invention, in one respect, is directed to a reusable mold for making a contact lens, comprising a first mold half having a first mold surface in contact with a silicone containing lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the silicone containing lens forming composition is polymerizable and/or crosslinkable by a UV radiation, wherein at least one of the mold halves is made from an oxide glass comprising fluorine and/or fluoride.

Modern high-volume mass production process for medical devices like contact lenses utilizes re-usable molds in each production cycles. A prerequisite that molds could be reusable is that they have equivalent and reproducible clean surface properties in each production cycles. Especially the cleaning of molds utilized for the production of silicon hydrogel contact lenses by the Lightstream technology is very challenging: the molds are made of glass and quartz, i.e. have a high surface energy and are therefore easily soiled by the silicon compounds with their low surface energy utilized for the lens production.

This silicon compounds could be cleaned off easily in laboratory by organic solvents like 2-Propanol. But for high mass-production process like the Lightstream technology an organic solvent based cleaning process is difficult to realize. Safety, environ mental and consumption aspects in combination with high process times needed for solvent removing and rinsing prevents such an application. Therefor would be a water based cleaning process the best for such a process.

According to the present invention, a water based cleaning process refers to a process which operates well with a water based solution spraying or soaking cleaning technology with no foam generation and removes lens forming material residue on the mold effectively. The water based solution refers to a solution substantially free of organic solvent. Substantially free of organic solvent refers to a solution has less than 15% by weight organic solvent, preferably less than 10% by weight organic solvent, more preferably less than 5% by weight organic solvent, still more preferably less than 2% by weight organic solvent, most preferably less than 0.5% by weight organic solvent.

The invention is partly based on the discovery that an oxide glass comprising fluorine and/or fluoride enable to achieve a percentage of reduction in the lens forming material residue on the molding surface by at least 30% of the mold halves made from an oxide glass comprising fluorine and/or fluoride relative to the molding surface of the mold halves made from an oxide glass comprising no fluorine and/or fluoride. It is believed that the cleaning of molds utilized for the production of silicone hydrogel contact lenses by the Lightstream technology is very challenging because the molds are made of glass and quartz, i.e. having a high surface energy and are therefore easily soiled by the silicon compounds with their low surface energy utilized for the lens production. The mold made from oxide glass comprising fluorine and/or fluoride has a lower surface energy than the mold made from glass and quartz; therefore less easily soiled by the silicon compounds with their low surface energy utilized for the lens production. As such, a reduction in the lens forming material residue on the molding surface of the mold halves being made from an oxide glass comprising fluorine and/or fluoride can be achieved comparing to the molding surface of the mold halves being made from an oxide glass comprising no fluorine and/or fluoride.

According to the present invention, a lens-forming material refers to any material which can be polymerized and/or crosslinked by actinic radiation to form a contact lens. A preferred group of lens-forming materials are prepolymers which are water-soluble and/or meltable. It would be advantageous that a lens-forming material comprises primarily one or more prepolymers which are preferably in a substantially pure form (e.g., purified by ultrafiltration). For example, prefunctionalised PVA (polyvinyl alcohol) polymer used as lens forming material. A more preferred group of lens forming materials is silicone-containing hydrogel lens forming material. Generally silicone-containing hydrogel lens forming material comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent, a free-radical initiator (photoinitiator or thermal initiator), a hydrophilic vinylic macromer/prepolymer, and combinations thereof, as well known to a person skilled in the art.

The processes which may be considered for the production of molds using oxide glass comprises fluorine and/or fluoride may be a number of techniques, for example precision glass molding and single point diamond turning.

Precision glass molding is a replicative process that allows the production of high precision optical components from glass with or without grinding and polishing. The process is also known as ultra-precision glass pressing. It is used to manufacture precision glass lenses for consumer products such as digital cameras, and high-end products like medical systems. The main advantage over mechanical lens production is that complex lens geometries such as aspheres can be produced cost-efficiently.

The precision glass molding process consists of the following steps:
1. The glass blank is loaded into the lower side of the molding tool.
2. Oxygen is removed from the working area by filling with nitrogen and/or evacuation of the process chamber.
3. The tool system is nearly closed (no contact of the upper mold) and the entire system of mold, die and glass is heated up. Infrared lamps are used for heating in most systems.
4. After reaching the working temperature, which is between the transition temperature and the softening point of the glass, the molds close further and start pressing the glass in a travel-controlled process.
5. When the final thickness of the part has been achieved, the pressing switches over to a force-controlled process.
6. After molding has been completed, the glass is cooled down and the working environment is filled with nitrogen. When the molded part has cooled to the point where it can be handled, it is removed from the tool.
7. The molded part needs a polishing procedure pending on the high precision design. The parts have to polish for achieving the accurate needed design.

Precision glass molding process is economical when mass production is required. But when the production requirement is small, then the molding process is not economical. When the objective is to produce lenses from an inorganic amorphous glass with high dimensional accuracy and small in number it is applied the machining process as final operation. In this case, diamond turning is expected to be economically viable to produce the optical parts from inorganic amorphous glass using Single Point Diamond Turning machine.

Diamond turning is a process of mechanical machining of precision elements using lathes or derivative machine tools (e.g., turn-mills, rotary transfers) equipped with natural or synthetic diamond-tipped tool bits. The term single-point diamond turning (SPDT) is sometimes applied, although as with other lathe work, the "single-point" label is sometimes only nominal (radiused tool noses and contoured form tools being options). The process of diamond turning is widely used to manufacture high-quality complex optical parts in either spherical or aspheric design using crystals, metals, polymers (such as acrylic). Optical elements produced by the means of diamond turning are used in optical assemblies in telescopes, video projectors, missile guidance systems, lasers, scientific research instruments, and numerous other systems and devices. Most SPDT today is done with computer numerical control (CNC) machine tools. Diamonds also serve in other machining processes, such as milling, grinding, and honing.

In diamond turning, the intended shape and surface produced depend on machine tool accuracy and other machining parameter. The main machining parameters are tool feed rates, spindle speed and depth of cut. The tool feed rate is normally expressed in terms of either distance travelled by the tool per unit time (mm/min) or distance travelled per unit rotation (mm/revolution). It is most common to see the distance per revolution as it is directly related to the anticipated theoretical surface finish. Rake angle is a parameter used in various cutting and matching processes, describing the angle of the cutting face relative to the work. There are two rake angles, namely the back rake angle and side rake angle, both of which help to guide chip flow. There are three types of rake angles: positive, negative, and zero. If the leading edge of the blade is ahead of the perpendicular, the angle is, by definition, negative. A rake angle is positive when the blade is behind the perpendicular. Generally, positive rake angles: a) make the tool more sharp and pointed. This reduces the strength of the tool, as the small included angle in the tip may cause it to chip away, b) reduce cutting forces and power requirements, c) helps in the formation of continuous chips in ductile materials, and d) can help avoid the formation of a built-up edge. By contrast, negative rake angles: a) make the tool more blunt, increasing the strength of the cutting edge, b) increase the cutting forces, c) can increase friction, resulting in higher temperatures, d) can improve surface finish. A zero rake angle is the easiest to manufacture, but has a larger crater wear when compared to positive rake angle as the chip slides over the rake face.

If the leading edge of the blade is ahead of the perpendicular, the angle is, by definition, negative.

The following is a description of the lathe setup and process used at the present invention to produce optical surfaces on glass utilizing single point diamond turning technology.

Cutting was performed on an Optoform 80 ultra-precision lathe manufactured by Precitech Inc, utilizing Contour natural diamond tool inserts.

Spindle speed is the speed set on the machine in RPM which rotates the substrate being lathed or cut. The processing speed for diamond turning glass will range between 4500-5500 RPM in a clockwise rotation.

Rough-Cut Depth is the amount of material removed in the first part of the cutting sequence. Here the parts general shape is formed on the material. The depth is set on the machine and in in general for optical tooling it will be set in the micron range (0.000 mm). For the diamond turning of glass the range for the rough cut should not exceed 0.035 mm.

Finish-Cut Depth is the amount of material removed that will produce a smooth high finish optical surface. The depth is set on the machine and will not usually exceed 0.010 mm. The finish cut depth for diamond turning glass is 0.002 mm or less.

Rough-Cut Feedrate is the speed the diamond tool travels across the surface of the part being lathed. The speed for this cut is normally faster and is set on the machine. Setting for this parameter when turning glass will be 15 mm/min.

Finish-Cut Feedrate is the speed the diamond tool travels across the surface of the part being lathed during the final step or cut of the process. The speed for this cut is considerably lower than the rough-cut. Slowing the speed produces the high quality surface which is defined as an optical surface. For turning glass this speed will range from 6.5 mm/min or slower.

Cutting Fluid or coolant is a steady mist of fluid applied to the surface of the part being machined. This fluid keeps the surface cool preventing friction which will result in poor surface quality. Also this mist stream helps remove cutting debris build up at the cutting point of the diamond tool. For cutting glass we use odorless mineral spirits manufactured by Hubbard Hall Corporation.

The diamond rake angle ranges from negative 25 degree, other SPDT conditions are provided as follows:
Spindle Speed—2000 RPM
Rough Cut Feedrate—20 mm/min
Rough Cut Depth—0.000800 mm
Finish Cut Feedrate—15 mm/min
Finish Cut Depth—0.00050 mm
Metrology: Nominal Radius—8.803
Sag—4.693

Mold radius is a defined measurement of a curve that makes a concave or convex mold surface. This measurement is unique to the optical design to deliver contact lens performance requirements. The measurement is taking utilizing the Fisba Optik FS10M interferometer.

Molds sag is a measurement taking in the Z-axis from a pre-determined point to the apex of a convex or concave surface. This measurement is defined by design and is critical in determining the lens edge and center thickness. Mold Sag or justify distance is measured using the Nikon VMR-3020.

According to the present invention, any oxide glass comprising fluorine and/or fluoride can be used to form a reusable mold, as long as the reusable mold has a percentage of reduction in the lens forming material residue on the molding surface by at least 30% of the mold halves is made from an oxide glass comprising fluorine and/or fluoride relative to the molding surface of the mold halves is made from an oxide glass comprising no fluorine and/or fluoride. A preferred oxide glass further comprises oxide glass selected from the group consisting of selected from the group consisting of potassium oxide, magnesium oxide, calcium oxide, strontium oxide, barium oxide, boron oxide, aluminum oxide, silicon oxide, phosphorous oxide, and a combination thereof. A more preferred oxide glass further comprises oxide glass selected from the group consisting of phosphorous oxide, silicon oxide and a combination thereof. A still more preferred oxide glass comprises 1%-30% phosphorous oxide. A still even more preferred oxide glass comprises 10%-20% phosphorous oxide. A preferred group of oxide glass comprises fluorine and/or fluoride is commercially available, for example S-FPL51, S-FPL53 (available from Ohara), N-FK5, N-FK51A, N-PK52A (available from Schott) and FCD1, FCD100 (available from Hoya).

Table 1 lists the composition (formula) of various glasses, whereby the data values are taken from the Material safety data sheet (MSDS) from suppliers: Schott, Hoya and Ohara.

TABLE 1

| | | Manufacture | | | | | | | |
|---|---|---|---|---|---|---|---|---|---|
| Grade | Formula | Schott N-B270 | Schott N-FK5 | Schott N-FK51A | Schott N-PK52A | Hoya FCD1 | Hoya FCD100 | Ohara S-FPL51 | Ohara S-FPL53 |
| Lithium Oxide | $Li_2O$ | | | | | | | | |
| Sodium Oxide | $Na_2O$ | 1-10 | | | | | | | 0-2 |
| Potassium Oxide | $K_2O$ | 1-10 | 10-20 | | | | | | |
| Magnesium oxide | MgO | | | 1-10 | 1-10 | | | 2-10 | 2-10 |
| Calcium Oxide | CaO | 1-10 | | 1-10 | 1-10 | | | | |
| Strontium Oxide | SrO | | | 10-20 | 10-20 | | | 10-20 | 10-20 |
| Barium Oxide | BaO | 1-10 | | 10-20 | 10-20 | 10-20 | 1-10 | 0-2 | |
| Lanthanum Oxide | $La_2O_3$ | | | | | | | | |
| Titanium Oxide | $TiO_2$ | <1 | | | | | | | |
| Zirconium Oxide | $ZrO_2$ | | | | | | | | |
| Niobium pentoxide | $Nb_2O_5$ | | | | <1 | | | | |
| Zinc Oxide | ZnO | | | | | | | | |
| Gadolinium oxide | $Cd_2O_3$ | | | | | | | | |
| Boron oxide | $B_2O_3$ | | 10-20 | | | | | | |
| Aluminum oxide | $Al_2O_3$ | | | 10-20 | 10-20 | <1 | | 2-10 | 0-2 |
| Silicon oxide (silica) | $SiO_2$ | 50-60 | 60-70 | | | | | | |
| Germanium Oxide | $GeO_2$ | | | | | | | | |
| Tellurium oxide | $TeO_2$ | | | | | | | | |
| Lead oxide | $PbO_2$ | | | | | | | | |
| Phosphorous oxide | $P_2O_5$ | | | 10-20 | 10-20 | 20-30 | 1-10 | 20-30 | 2-10 |
| Arsenic Trioxide | $As_2O_3$ | | | | | | | | |

TABLE 1-continued

| Grade | Formula | Manufacture | | | | | | | |
|---|---|---|---|---|---|---|---|---|---|
| | | Schott N-B270 | Schott N-FK5 | Schott N-FK51A | Schott N-PK52A | Hoya FCD1 | Hoya FCD100 | Ohara S-FPL51 | Ohara S-FPL53 |
| Antimony Trioxide | $Sb_2O_3$ | <1 | <1 | <1 | | | | | |
| Bismuth oxide | $Bi_2O_3$ | | | | | | | | |
| Yttrium oxide | $Y_2O_3$ | | | | | | | | |
| Sodium fluoride | NaF | | | | | | | | |
| Fluorine | F | | 1-10 | 20-30 | 20-30 | | | | 0-2 |
| Potassium bifluoride | $KHF_2$ | | | | | | | | 0-2 |
| Magnesium fluoride | $MgF_2$ | | | | | 5-10 | 1-10 | 2-10 | 2-10 |
| Calcium fluoride | $CaF_2$ | | | | | 10-20 | 20-30 | 10-20 | 20-30 |
| Strontium Fluoride | $SrF_2$ | | | | | 20-30 | 20-30 | 20-30 | 20-30 |
| Barium fluoride | $BaF_2$ | | | | | | 1-10 | 10-20 | 10-20 |
| Yttrium fluoride | $YF_3$ | | | | | 1-5 | 1-10 | | 2-10 |
| Ammonium fluoride | $NH_4F$—HF | | | | | | | | 0-2 |
| Aluminum Fluoride | $AlF_3$ | | | | | 10-20 | 30-40 | 10-20 | 20-30 |
| Barium fluoride | $BaCl_2$ | | | | | | 0-1 | | |

The invention, in another respect, relates to a method for producing a contact lens, comprising the steps of:

(1) providing a contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein at least one of the mold halves is made from an oxide glass comprising fluorine and/or fluoride, (2) introducing a lens-forming composition into the cavity formed by the first and second molding surfaces, material, wherein the lens-forming material is crosslinkable and/or polymerizable by actinic radiation;

(3) crosslinking/polymerizing the lens-forming material in the mold to form a lens having a polymer matrix;

(4) opening the mold and removing the formed contact lens from the mold, (5) washing the first and second molding surface with a water base system, wherein the molding surface of step (5) is characterized by having a percentage of reduction in the lens forming material residue on the molding surface by at least 30% of the mold halves is made from an oxide glass comprising fluorine and/or fluoride relative to the mold surface of the mold halves is made from an oxide glass comprising no fluorine and/or fluoride.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLES

Example 1

Preparation of CE-PDMS Macromer

In the first step, .alpha.,.omega.-bis(2-hydroxyethoxypropyl)-polydimethylsiloxane (Mn=2000, Shin-Etsu, KF-6001a) is capped with isophorone diisocyanate (IPDI) by reacting 49.85 g of .alpha.,.omega.-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40.degree. C., forming IPDI-PDMS-IPDI. In the second step, a mixture of 164.8 g of .alpha.,.omega.-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40.degree. C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (i.e., CE-PDMS terminated with methacrylate groups).

Alternate Preparation of CE-PDMS Macromer with Terminal Methacrylate Groups 240.43 g of KF-6001 is added into a 1-L reactor equipped with stirring, thermometer, and cryostat, dropping funnel, and nitrogen/vacuum inlet adapter, and then dried by application of high vacuum (2.times.10.sup.-2 mBar). Then, under an atmosphere of dry nitrogen, 320 g of distilled MEK is then added into the reactor and the mixture is stirred thoroughly. 0.235 g of DBTDL is added to the reactor. After the reactor is warmed to 45.degree. C., 45.86 g of IPDI is added through an addition funnel over 10 minutes to the reactor under moderate stirring. The reaction is kept for 2 hours at 60.degree. C. 630 g of KF-6002 dissolved in 452 g of distilled MEK are then added and stirred until a homogeneous solution is formed. About 0.235 g of DBTDL is added, and the reactor is held at about 55.degree. C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18.degree. C. to obtain CE-PDMS macromer with terminal methacrylate groups.

Example 2

Preparation of Lens Formulations

A lens formulation is prepared by dissolving components in 1-propanol to have the following composition: 33% by weight of CE-PDMS macromer prepared in Example 2, 17% by weight of N-[tris(trimethylsiloxy)-silylpropyl]acrylamide (TRIS-Am), 24% by weight of N,N-dimethylacrylamide (DMA), 0.5% by weight of N-(carbonyl-methoxypolyethylene glycol-2000)-1,2-disteaoyl-sn-glycero-3-phosphoethanolamin, sodium salt) (L-PEG), 1.0% by weight Darocur 1173 (DC1173), 0.1% by weight of visitint (5% copper phthalocyanine blue pigment dispersion in tris(trimethylsiloxy)silylpropylmethacrylate, TRIS), and 24.5% by weight of 1-propanol.

Example 3

Preparation of Lenses

Lenses are prepared by cast-molding from the lens formulation prepared above in a reusable mold, similar to the mold shown in FIGS. 1-6 in U.S. Pat. Nos. 7,384,590 and 7,387,759 (FIGS. 1-6). The mold comprises a female mold half made of S-PFL53 (fluorinated glass and a male mold half made of quartz. The UV irradiation source is a Hamamatsu lamp with the WG335+TM297 cut off filter at an intensity of about 4 mW/cm.sup.2. The lens formulation in the mold is irradiated with UV irradiation for about 25 seconds.

Example 4

Fluorinated Female Mold Half

S-PFL53 and Quartz Male Mold Half

In order to explore the use of oxide glass comprising fluorine and/or fluoride (S-PFL53 glass) female mold, 40 lenses were made from the above formulation.

Fluorinated Female Mold (S-PFL53)

Initial Inspection: Backside of glass is frosted. Surface is clean and mostly smooth with some very faint polishing marks and several specks.

After 10 Lenses: Mold is still completely clean. No change observed.

After 20 Lenses: Mold is still completely clean. No change observed.

After 30 Lenses: Mold is still completely clean. No change observed.

After 40 Lenses: Mold is still completely clean. No change observed

Quartz Male Mold

Initial Inspection: Mold surface is clean and smooth, but has several scratches and specks After 10 Lenses: Mold has large patch of heavy residue stretching from edge to center (~30% of mold) with some crystals forming on ~30% of the chrome mask but not extending past edge.

After 20 Lenses: Mold has only two small patches of moderate residue on optic zone, but the entire chromium mask is covered in crystals. Some of the crystals extend into the lenticular.

After 30 Lenses: Mold has several large patches of heavy residue (about 50% of mold) with crystals around entire chromium mask. Some crystals extend into lenticular.

After 40 Lenses: Entire optical zone has moderate residue. Lenticular zone has several patches of moderate residue. Chromium mask is covered in crystals, some of which extend into lenticular

Example 5

Preparations of Lens Formulations. A lens formulation is prepared by dissolving components in 1-propanol to have the following composition: about 32% by weight of CE-PDMS macromer prepared in Example 2, about 21% by weight of TRIS-Am, about 23% by weight of DMA, about 0.6% by weight of L-PEG, about 1% by weight of DC1173, about 0.1% by weight of visitint (5% copper phthalocyanine blue pigment dispersion in TRIS), about 0.8% by weight of DMPC, about 200 ppm H-tempo, and about 22% by weight of 1-propanol.

Preparation of Lenses. Lenses are Prepared by Cast-Molding from the Lens Formulation Prepared above in a reusable mold (fluorinated female mold half (S-PFL53 and quartz male mold half), similar to the mold shown in FIGS. 1-6 in U.S. Pat. Nos. 7,384,590 and 7,387,759 (FIGS. 1-6). The lens formulation in the molds is irradiated with UV irradiation (16.0 mW/cm.sup.2) for about 27 seconds.

After the initial inspection, the molds were used for lens-making according to the processing conditions outlined below. After every set of 10 lenses, the molds were inspected (without any additional cleaning). More images were acquired after 10 lenses and after 40 lenses.

The Fluorinated BC (N00215) and the Control Glass FC (CY12M095W) were each used twice. Between groups, these molds were cleaned again with IPA, and microscopic inspection was used to verify the cleanliness of the molds prior to starting the next set of lenses.

Processing Conditions

| | |
|---|---|
| Formulation | As prepared examples 2 and 5 |
| Dosing | Harvard Pump with 0.0500 mL (with pre-dose) |
| Forming | Molds were manually closed using Arbor press |
| Curing | 27 s at 16 mW/cm2 - No Relative Mold Moving was used |
| Lens | Almost all lenses stayed on the male mold. |
| Removal | Lens was removed by tweezers after ~20 s DI water soak. Lenses were left in basket shells in water until extracted. |

Control FC (Soda Lime Glass N-B270) with Fluorinated BC (Fluorinated N-FK5) [40 lenses]
  Soda Lime Glass N-B270: Heavy residue on entire mold
  Fluorinated N-FK5: Moderate residue about 60% of mold
  Delensing was easy, no mold-related lens residue
Fluorinated FC (Fluorinated Glass N-FK51A) with Fluorinated BC (Fluorinated N-FK5) [40 lenses]
  Fluorinated Glass N-FK51A: Mold was very clean (substantially free residue) throughout lens-making
  Fluorinated N-FK5: Moderate residue and crystals on chromium mask and edge
  Delensing was more difficult, lenses had residue near edge, more edge tears Control FC (Soda Lime Glass N-B270) with Control BC (Quartz) [10 lenses]
  Soda Lime Glass N-B270: Heavy residue on entire mold
  Quartz: Heavy residue in optic and lenticular, crystals on chromium mask
  Delensing was easy, no mold-related lens residue The mold cleanability is visually inspected for the lens forming material residue on the molding surface over the entire mold surface by a Microscope at a magnification of ×10 or bigger.

From the above data, the molding surface of either base curve mold or front curve mold after washing with a water base system has a percentage of reduction in the lens forming material residue on the molding surface by at least 30%, preferably 40%, more preferably 50%, still more preferably 70% and still even more preferably 90% of the mold halves is made from an oxide glass comprising fluorine and/or fluoride relative to the mold surface of the mold halves is made from an oxide glass comprising no fluorine and/or fluoride, such as soda lime glass N-B270.

What we claim is:

1. A method for producing a contact lens, comprising: the steps of:
   (1) providing a contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein at least one of the mold halves is made from an oxide glass comprising fluorine and/or fluoride,
   (2) introducing a silicone-containing lens-forming material into the cavity formed by the first and second molding surfaces, wherein the lens-forming composition is crosslinkable and/or polymerizable by actinic radiation;
   (3) crosslinking/polymerizing the lens-forming material in the mold to form a lens having a polymer matrix;
   (4) opening the mold and removing the formed contact lens from the mold,
   (5) washing the first and second molding surface with a water base cleaning system, wherein the molding surface of step (5) is characterized by having a percentage of reduction in the lens forming material residue on the molding surface by at least 30% when one of the mold halves is made from an oxide glass comprising fluorine and/or fluoride relative to the mold surface when one of the mold halves is made from an oxide glass comprising no fluorine and/or fluoride.

2. The method of claim 1, wherein the silicone-containing lens forming material comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent, a free-radical initiator, a hydrophilic vinylic macromer/prepolymer, and combinations thereof.

3. The method of claim 1, wherein the actinic radiation is a UV radiation.

4. The method of claim 1, wherein the oxide glass further comprises oxide glass selected from the group consisting of potassium oxide, magnesium oxide, calcium oxide, strontium oxide, barium oxide, boron oxide, aluminum oxide, silicon oxide, phosphorous oxide, and a combination thereof.

5. The method of claim 4, wherein the oxide glass further comprises oxide glass selected from the group consisting of phosphorous oxide, silicon oxide and a combination thereof.

6. The method of claim 5, wherein the oxide glass further comprises 1%-30% phosphorous oxide.

7. The method of claim 1, wherein the molding surface of step (5) is characterized by having a percentage of reduction in the lens forming material residue on the molding surface by at least 50% when one of the mold halves is made from an oxide glass comprising fluorine and/or fluoride relative to the mold surface when one of the mold halves is made from an oxide glass comprising no fluorine and/or fluoride.

8. The method of claim 7, wherein the molding surface of step (5) is characterized by having a percentage of reduction in the lens forming material residue on the molding surface by at least 70% when one of the mold halves is made from an oxide glass comprising fluorine and/or fluoride relative to the mold surface when one of the mold halves is made from an oxide glass comprising no fluorine and/or fluoride.

9. The method of claim 7, wherein the molding surface of step (5) is characterized by having a percentage of reduction in the lens forming material residue on the molding surface by at least 90% when one of the mold halves is made from an oxide glass comprising fluorine and/or fluoride relative to the mold surface when one of the mold halves is made from an oxide glass comprising no fluorine and/or fluoride.

* * * * *